(12) United States Patent
Ishiki et al.

(10) Patent No.: US 10,471,352 B2
(45) Date of Patent: Nov. 12, 2019

(54) GAME PROCESSING METHOD AND INFORMATION PROCESSING DEVICE

(71) Applicant: KABUSHIKI KAISHA SEGA Games, Tokyo (JP)

(72) Inventors: Koutarou Ishiki, Tokyo (JP); Shinya Sakai, Tokyo (JP); Kazuma Itoh, Tokyo (JP); Yuko Tatsuko, Tokyo (JP); Akiko Takada, Tokyo (JP)

(73) Assignee: Kabushiki Kaisha Sega Games, Tokyo (JP)

( * ) Notice: Subject to any disclaimer, the term of this patent is extended or adjusted under 35 U.S.C. 154(b) by 108 days.

(21) Appl. No.: 15/695,414

(22) Filed: Sep. 5, 2017

(65) Prior Publication Data

US 2017/0361229 A1    Dec. 21, 2017

Related U.S. Application Data

(63) Continuation of application No. PCT/JP2016/052585, filed on Jan. 29, 2016.

(30) Foreign Application Priority Data

Mar. 4, 2015 (JP) .................................. 2015-042275

(51) Int. Cl.
*A63F 13/25* (2014.01)
*A63F 13/42* (2014.01)
(Continued)

(52) U.S. Cl.
CPC .............. *A63F 13/42* (2014.09); *A63F 13/25* (2014.09); *A63F 13/33* (2014.09); *A63F 13/335* (2014.09);
(Continued)

(58) Field of Classification Search
None
See application file for complete search history.

(56) References Cited

U.S. PATENT DOCUMENTS

| | | | |
|---|---|---|---|
| 2007/0082727 A1* | 4/2007 | Ebisawa | G07F 17/32 463/20 |
| 2008/0287175 A1* | 11/2008 | Kusuda | A63F 13/12 463/17 |
| 2016/0214014 A1* | 7/2016 | Shiota | A63F 13/2145 |

FOREIGN PATENT DOCUMENTS

| | | |
|---|---|---|
| JP | 2001-353371 A | 12/2001 |
| JP | 2002-58869 A | 2/2002 |

(Continued)

OTHER PUBLICATIONS

Office Action issued in corresponding Japanese Application No. 2016-224444 dated Sep. 5, 2017 (9 pages).

(Continued)

*Primary Examiner* — Ronald Laneau
(74) *Attorney, Agent, or Firm* — Osha Liang LLP

(57) ABSTRACT

A game processing method that causes a computer to execute a game program includes displaying, with a touchscreen of the computer, a reference operation to a user, receiving, with the touchscreen, an input operation from a user, determining, with a processor of the computer, a matching degree between the input operation and the reference operation, outputting, from the processor to a memory of the computer, a level of the matching degree between the input operation and the reference operations based on the determination, counting, with the processor, the number of consecutive times that the level continuously exceeds a predetermined threshold level, and outputting, from the processor to the memory, information to award a bonus at a predetermined winning probability for an achieved number (Continued)

of consecutive times when the number of consecutive times reaches the achieved number of consecutive times.

12 Claims, 12 Drawing Sheets

(51) Int. Cl.

| | | |
|---|---|---|
| A63F 13/69 | (2014.01) | |
| A63F 13/46 | (2014.01) | |
| A63F 13/44 | (2014.01) | |
| A63F 13/33 | (2014.01) | |
| A63F 13/335 | (2014.01) | |
| A63F 13/35 | (2014.01) | |
| A63F 13/73 | (2014.01) | |
| A63F 13/2145 | (2014.01) | |

(52) U.S. Cl.
CPC .............. *A63F 13/35* (2014.09); *A63F 13/44* (2014.09); *A63F 13/46* (2014.09); *A63F 13/69* (2014.09); *A63F 13/73* (2014.09); *A63F 13/2145* (2014.09); *A63F 2300/8047* (2013.01)

(56) References Cited

FOREIGN PATENT DOCUMENTS

| | | |
|---|---|---|
| JP | 2011-521765 A | 7/2011 |
| JP | 4846765 B2 | 12/2011 |
| JP | 2014-239707 A | 12/2014 |
| WO | 2009/051284 A2 | 4/2009 |
| WO | 2014/068960 A1 | 5/2014 |

OTHER PUBLICATIONS

Office Action issued in corresponding Japanese Application No. 2016-224444 dated Jun. 21, 2017 (6 pages).
Written Opinion issued in corresponding International Application No. PCT/JP2016/052585 dated Mar. 22, 2016 (10 pages).
International Search Report issued in corresponding International Application No. PCT/JP2016/052585 dated Mar. 22, 2016 (7 pages).
App Android, ENTA, Inc., "love live! idle festival" No. 009, pg. 48-53, dated Sep. 19, 2013 (8 pages).
"Love live! School Idle Paradise Authorized guidebook," Kadokawa Incorporated Company, 1st Edition, dated Nov. 20, 2014 (4 pages).
"K-On! After school live!!" Gemaga, Softbank Creative Incorporated Company, vol. 27, dated Nov. 1, 2010 (4 pages).

\* cited by examiner

Performance scene list

| Performance scene | .. |
|---|---|
| : | : |

Performed song data

| Performance ID | Song data | .. |
|---|---|---|

Tap musical score data

| Performance ID | Tap information (grid position, clock time, tap type, performance duration, etc.) | .. |
|---|---|---|

Performance list

| Performance ID | Performance title | Difficulty | .. |
|---|---|---|---|

Performance ID

| Performance ID |
|---|

Used deck

| Card ID list | .. |
|---|---|

Help friend list

| Help friend ID | Attribute | .. |
|---|---|---|
| : | : | : |

Help friend ID

| Help friend ID |
|---|

Lottery result for each combo number

| Combo number (1) Item information | Combo number (2) Item information | Combo number (3) Item information | Combo number (4) Item information | .. |
|---|---|---|---|---|

Combo number

| Current combo number |
|---|

Score

| Current score |
|---|

Acquired items

| Item ID list |
|---|

FIG. 2

Performance master

| Performance scene | Performance title | Performance ID | Difficulty | .. |
|---|---|---|---|---|
| | | | | |

Performance list

| Performance ID | Performance title | Difficulty | .. |
|---|---|---|---|
| | | | |

Friend Data

| Friend ID | Attribute | Image | .. |
|---|---|---|---|
| | | | |

Help friend list

| Help friend ID | Attribute | .. |
|---|---|---|
| : | : | |

Performance ID

| Performance ID |
|---|
| |

Combo master table

| Performance ID | Combo number (1) | Probability table ID | Item table ID | |
|---|---|---|---|---|
| | : | | | |
| | Combo number (4) | Probability table ID | Item table ID | .. |

Probability table

| Probability table ID | Item "1" winning probability | Item "2" winning probability | Item "3" winning probability | Item "4" winning probability | Item "5" winning probability | .. |
|---|---|---|---|---|---|---|
| | | | | | | |

Item table

| Item ID | asset_type "1" | asset_id "1" | asset_num"1" | |
|---|---|---|---|---|
| | : | | | |
| | asset_type "5" | asset_id "5" | asset_num"5" | .. |

Lottery result for each combo number

| Combo number (1) Item information | Combo number (2) Item information | Combo number (3) Item information | Combo number (4) Item information | .. |
|---|---|---|---|---|
| | | | | |

Performance result data

| User ID | Score | Combo number | Acquired items | .. |
|---|---|---|---|---|
| | | | | |

FIG. 6

GAME PROCESSING METHOD AND INFORMATION PROCESSING DEVICE

BACKGROUND

Technical Field

The present invention generally relates to a game processing method and an information processing device.

Related Art

Primarily in music-based computer games, there are known games in which it is determined whether or not individual input operations by the user (player) match a reference operation indicated by the computer, and the better the match is, that is, the more accurate the input operation is, the better is the evaluation given to the user. Furthermore, the accuracy of the input operation is evaluated in a plurality of levels, and the result of that evaluation and the number of times the input operation was consecutively (continuously) performed at or above a predetermined level (number of consecutive times) is displayed on a display device (see, for example, Patent Literature 1). The "number of consecutive times" here is generally called the "combo number."

Patent Literature 1: Japanese Patent No. 4,846,765

With the above-described computer game, players can enjoy competing to see who is better at an input operation according to the number of consecutive times, but for users unfamiliar with the input operation, it is difficult to make many consecutive input operations over a predetermined level, and it can be hard to derive enjoyment by achieving a certain number of consecutive times.

SUMMARY

One or more embodiments of the present invention allow even a user who is unfamiliar with an input operation to be able to enjoy achieving a certain number of consecutive times.

According to one or more embodiments of the present invention, a computer constituting an information processing device is made to function as a reference operation indication means for indicating a reference operation to a user, an input operation acceptance means for accepting an input operation from the user, a determination means for comparing the reference operation with the input operation and determining which of a plurality of levels is applicable on the basis of match, a counting means for counting the number of consecutive times that the level continuously exceeds a predetermined threshold level, and a bonus awarding means for awarding a bonus at a predetermined winning probability for a specific achieved number of consecutive times when the number of consecutive times reaches the achieved number of consecutive times.

According to one or more embodiments of the present invention, a game processing method that causes a computer to execute a game program includes displaying, with a touchscreen of the computer, a reference operation to a user, receiving, with the touchscreen, an input operation from a user, determining, with a processor of the computer, how closely or how much the input operation matches the reference operation (e.g., comparing the input operation to the reference operation and determining how closely the two operations match), outputting, from the processor to a memory of the computer, a level of a matching degree between the input operation and the reference operations based on the determination, counting, with the processor, the number of consecutive times that the level continuously exceeds a predetermined threshold level, and outputting, from the processor to the memory, information to award a bonus at a predetermined winning probability for an achieved number of consecutive times when the number of consecutive times reaches the achieved number of consecutive times.

According to one or more embodiments of the present invention, an information processing device includes a touchscreen that displays a reference operation to a user, and receives an input operation from the user, a memory, and a processor connected to the touchscreen and the memory and that determines a matching degree between the input operation and the reference operation, outputs, to the memory, a level of the matching degree between the input operation and the reference operations based on the determination, counts the number of consecutive times that the level continuously exceeds a predetermined threshold level, and outputs, to the memory, information to award a bonus at a predetermined winning probability for an achieved number of consecutive times when the number of consecutive times reaches the achieved number of consecutive times.

According to one or more embodiments of the present invention, even a user who is unfamiliar with an input operation can derive enjoyment from achieving a certain number of consecutive times.

BRIEF DESCRIPTION OF DRAWINGS

FIG. 2 is a diagram showing an example of the structure of data held in a storage area of a game application of a terminal device according to one or more embodiments of the present invention.

FIG. 6 is a diagram showing an example of the structure of data held in a storage area of a game management server device according to one or more embodiments of the present invention.

DETAILED DESCRIPTION

Embodiments of the present invention will be described in detail below with reference to the drawings in the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(Configuration)

Figure 1:
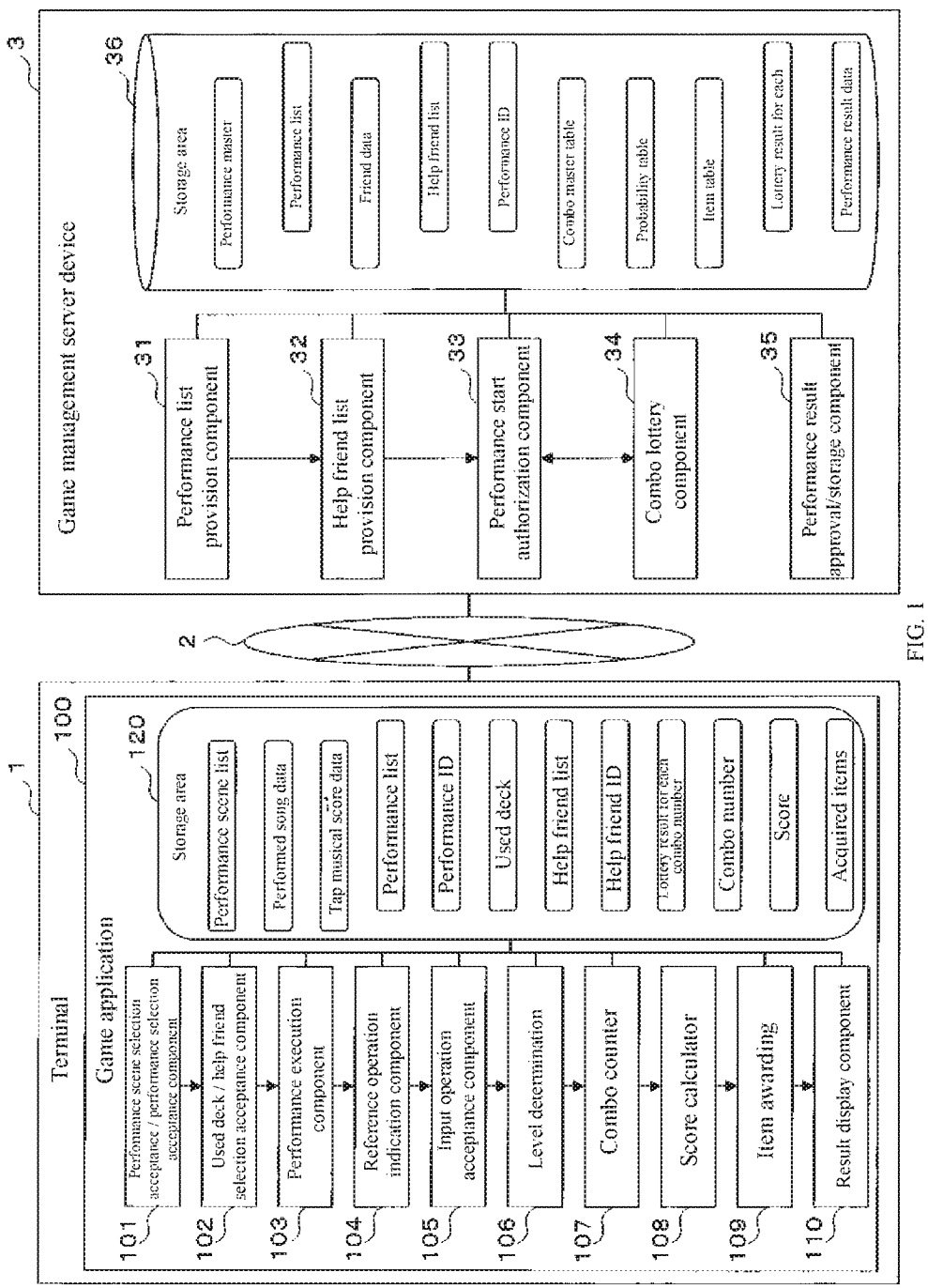
FIG. 1 is a diagram showing a configuration example of a system according to one or more embodiments of the present invention.

FIG. 1 is a diagram showing a configuration example of a system according to one or more embodiments of the present invention.

In FIG. 1, a terminal device 1 such as a smart phone, a tablet, a mobile phone, a Personal Computer (PC), or the like is connected to a network 2 such as the Internet, and a game management server device 3 is connected to the network 2. Both the terminal device 1 and the game management server device 3 are information processing devices. Sometimes there is no game management server apparatus 3, in which case the terminal apparatus 1 operates independently.

A game application (game application program) 100 is installed in the terminal device 1, and portions constituted by software include a performance scene selection acceptance/performance selection acceptance component 101, a used deck/help friend selection acceptance component 102, a performance execution component 103, a reference operation indication component 104, an input operation acceptance component 105, a level determination component 106, a combo counter 107, a score calculator 108, an item awarding component 109, and a result display component 110. Also, various kinds of data to be referred to or updated during processing are held in a storage area 120 allocated to the game application 100. The various kinds of data will be discussed in detail below.

The performance scene selection acceptance/performance selection acceptance component 101 has the function of accepting the selection of a performance scene from the user (player) of the terminal device 1, indicating to the user the performance (or performances) associated with that performance scene, and accepting the user's performance selection (decision).

The used deck/help friend selection acceptance component 102 has the function of accepting the user's selection of the deck to be used, which is a deck of cards used in the progress of a game, and accepting the user's selection (decision) of a help friend who cooperates in the progress of a game.

The performance execution component 103 has the function of executing a performance and performing basic screen display and audio output when it accepts a performance start indication from the user.

The reference operation indication component 104 has the function of displaying a screen (e.g., touchscreen) for indicating to the user a reference operation of a tap operation (an operation of touching the screen with a finger) in the execution of a performance by the performance execution component 103. The reference operation is a finger operation on the touchscreen of the terminal device 1. The tap operation is an example of the finger operations. For example, the finger operations include finger gestures such as slide finger and pinch spread operations.

The input operation acceptance component 105 has the function of accepting an input operation such as a tap operation from the user.

The level determination component 106 has the function of comparing the input operation accepted by the input operation acceptance component 105 with the reference operation indicated by the reference operation indication component 104 and determining which one of the plurality of levels is applicable on the basis of match. Thus, the level determination component 106 may determine a matching degree between the input operation and the reference operation.

The combo counter 107 has the function of counting the number of continuous (consecutive) times that the level determined by the level determination component 106 is at or above a predetermined level (number of consecutive times, combo number). If the deck to be used selected by the used deck/help friend selection acceptance component 102 includes a specific card (a death-dealing item or the like), the combo counter 107 performs a lottery at a predetermined winning probability when the continuation of a predetermined threshold level is interrupted, and, if there is a win, continues counting as if the continuation had not been interrupted.

The score calculator 108 has the function of calculating the score of the user on the basis of the level determined by the level determination component 106, the combo number counted by the combo counter 107, or the like.

When the combo number counted by the combo counter 107 has reached a specific number of times (a plurality of achieved number of consecutive times), the item awarding component 109 has the function of awarding an item as a bonus (remuneration, reward) at a winning probability that was allocated in advance to that number of times.

The result display component 110 has the function of displaying the user's score, the awarded item, etc., on the screen.

FIG. 2 is a diagram showing an example of the structure of data held in the storage area 120 of the game application 100 of the terminal device 1.

In FIG. 2, the performance scene list contains a plurality of "performance scenes." Performance song data has "song data" or the like associated with a "performance ID" that identifies a performance.

Tap musical score data has "tap information" or the like, which specifies the reference operation, associated with a "performance ID" that identifies a performance, Tap information includes the "grid position" where the tap is to be performed, the "time" at which the tap is to be performed (the elapsed time since the start of the song being performed), the "tap type" indicating the type of tap, and "performance duration."

Figure 3:
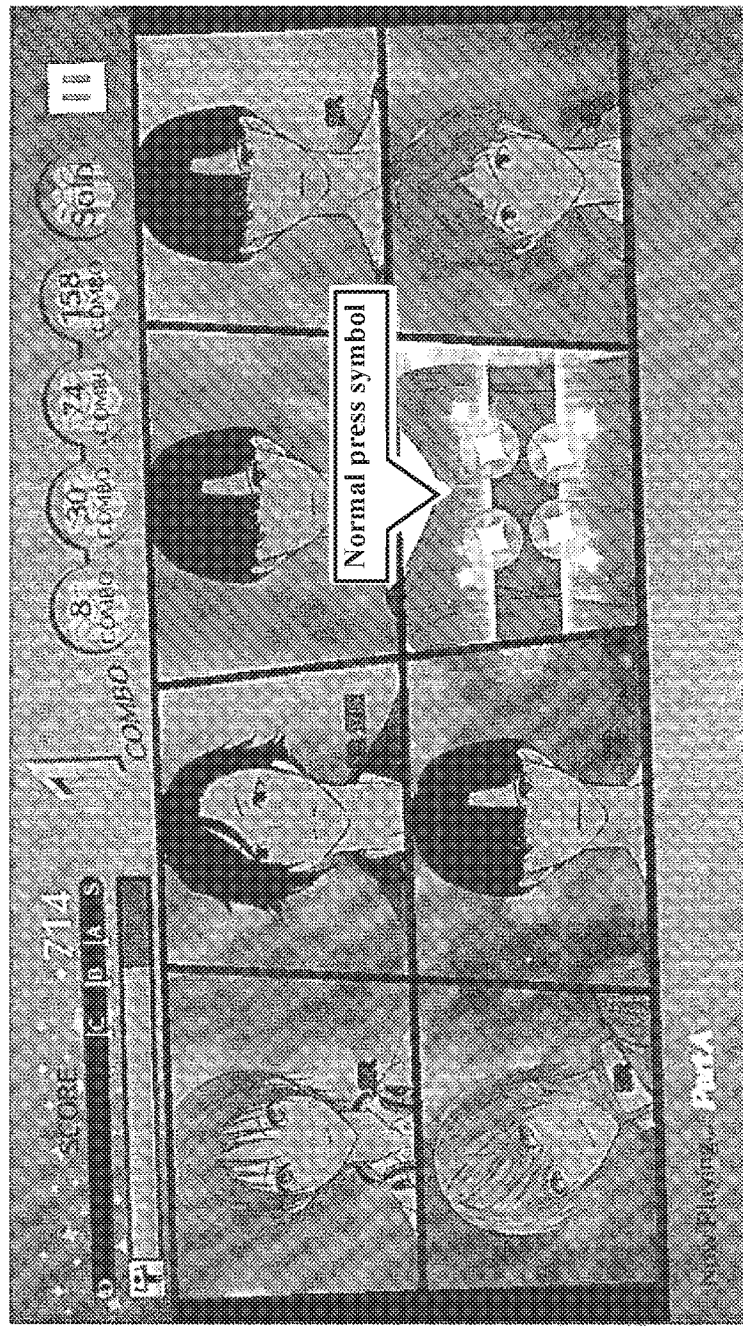
FIG. 3 is a diagram showing a screen example by type of tap (part 1) according to one or more embodiments of the present invention.

FIG. 3 shows an example of a screen when, out of the eight boxes provided on the screen, the tap type "normal press" is specified for the second box from the right in the bottom row, in this example, dots gradually move from the four corners of the box toward the center, and the point when the dots meet up in the center indicates the timing for tapping.

Figure 4:
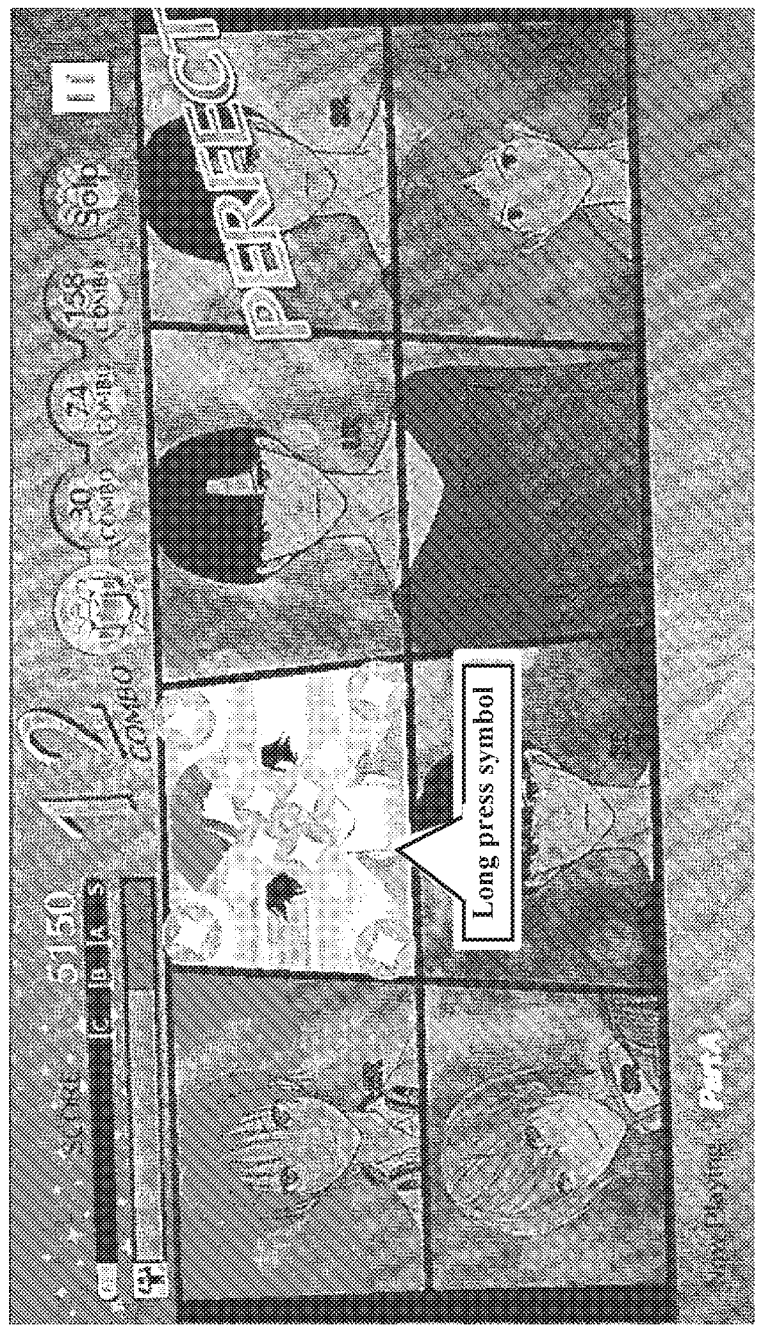
FIG. 4 is a diagram showing a screen example by type of tap (part 2) according to one or more embodiments of the present invention.

FIG. 4 shows an example of a screen when, out of the eight boxes provided on the screen, the tap type "long press" is specified for the second box from the left in the top row. In this example, dots separate from the four corners of the box (with dots remaining in the four corners) and gradually move toward the center, the background of a specific color moves as if a shutter were closing from the top and bottom, and the timing of the tap is indicated by continuing to press from the point when they meet up in the center until all the dots and the background disappear.

Figure 5:
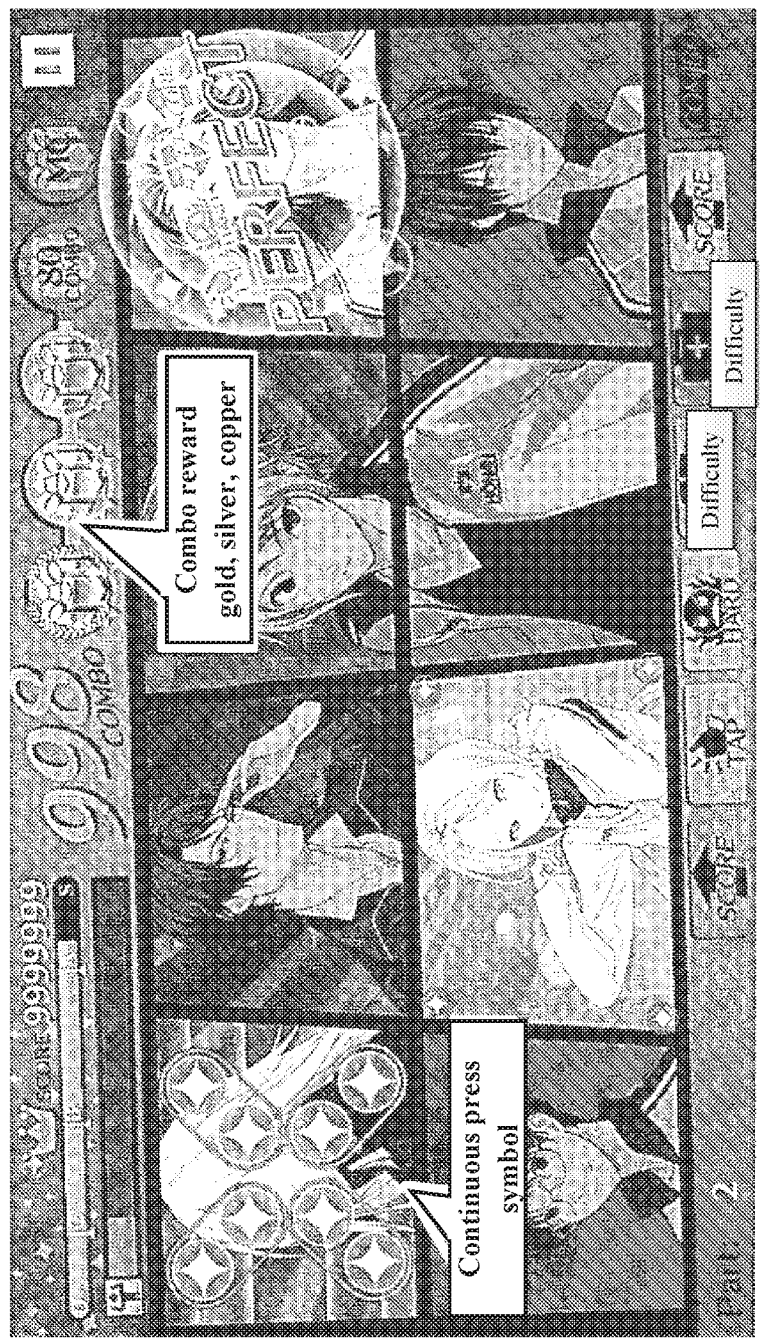
FIG. 5 is a diagram showing a screen example by type of tap (part 3) according to one or more embodiments of the present invention.

FIG. 5 shows an example of a screen when, out of the eight boxes provided on the screen, the first box from the right in the top row is tapped, and then the first box from the left in the top row is tapped to complete a "continuous press." The tap timing is the same as in a "normal press," but the display is changed. Although not depicted in the drawing, when two or more boxes are specified at the same time, the result is a "simultaneous press."

Returning to FIG. 2, a performance list is provided from the game management server device 3, and includes "performance ID," "performance title," and "difficulty," The performance ID is the "performance ID" selected (decided) by the user.

The used deck is what is selected by the user, and includes a "card ID list," The help friend list is provided from the game management server device 3, and includes a plurality of "help friend IDs" and "attributes." The help friend ID is the "help friend ID" selected (decided) by the user.

The lottery result for each combo number is provided from the game management server device 3, and includes item information corresponding to four kinds of achieved number of consecutive times: "combo number (1) item information." "combo number (2) item information," "combo number (3) item information," and "combo number (4) item information," Although the achieved number of consecutive times is four here, the number is not limited thereto.

The combo number is the current combo number. The score is the current score. The acquired items are a list of the item IDs of the current acquired items.

Returning to FIG. 1, the portions realized by software include a performance list provision component 31, a help friend list provision component 32, a performance start authorization component 33, a combo lottery component 34, and a performance result approval/storage component 35. Various kinds of data to be referred to or updated during processing are held in the storage area 36.

The performance list provision component 31 has the function of acquiring from the terminal device 1 and providing a performance list in response to a performance list request accompanying a performance scene selected by the user.

The help friend list provision component 32 has the function of acquiring from the terminal device 1 and providing a help friend list in response to a help friend list request.

The performance start authorization component 33 has the function of acknowledging the receipt of a performance start by performing authorization on a performance start authorization request from the terminal device 1. In acknowledging the receipt of a performance start, the performance start authorization component 33 also transmits data such as the lottery result for each combo number produced by the combo lottery component 34. The reasons for providing the lottery result for each combo number by performing a combo lottery before the start of a performance are to avoid problems if the terminal device 1 and the game management server device 3 should be unable to communicate after the start of the performance, and to prevent cheating (the fraudulent act of falsifying programs or data) on the terminal device 1 side. Therefore, when it is unnecessary to take such things into account, the terminal device 1 may send a notification to the game management server device 3 at the point when a specific combo number is established at the terminal device 1, and a combo lottery may be performed at the game management server device 3 and the result sent to the terminal device 1.

The combo lottery component 34 has the function of performing a lottery on the basis of the performance ID specified by the performance start authorization request, a combo master table, a probability table, and an item table, and deciding the item that will serve as a bonus for each specific combo number (achieved number of consecutive times). The result of the combo lottery is delivered to the performance start authorization component 33 as a lottery result for each combo number.

The performance result approval/storage component 35 has the function of approving a performance result approval request from the terminal device 1, acknowledging the receipt of the performance result, and storing the performance result.

When there is no game management server device 3, the function of the game management server device 3 is absorbed by the game application 100 of the terminal device 1.

FIG. 6 is a diagram showing an example of the structure of data held in the storage area 36 of the game management server device 3.

In FIG. 6, the performance master includes "performance scene," "performance title," "performance ID," and "difficulty." The performance list is extracted from the performance master by using the performance scene as a key, and includes "performance ID," "performance title," and "difficulty." Friend data includes "friend ID," "attribute," and "image." The help friend list includes a plurality of "help friend IDs" and "attributes." The performance ID is the "performance ID" selected (decided) by the user of the terminal device 1.

In the combo master table, "combo number," "probability table ID," and "item table ID" are associated with the "performance ID" for each frame of the four achieved number of consecutive times. Although the achieved number of consecutive times is four here, the number is not limited thereto. The "performance ID" may be associated with a specific number of a plurality of frames, without associating "performance ID" with each frame of the achieved number of consecutive times. For example, one common "performance ID" may be associated with all frames.

In the probability table, "winning probability" is associated with "probability table ID" for each frame of five items. Although five item frames are used here, the number is not limited thereto.

In the item table, "asset_type," "asset_id" and "asset_num" are associated with "item table II)" for each frame of five items. The number of item frames used here is the same as in the probability table.

Figure 7:
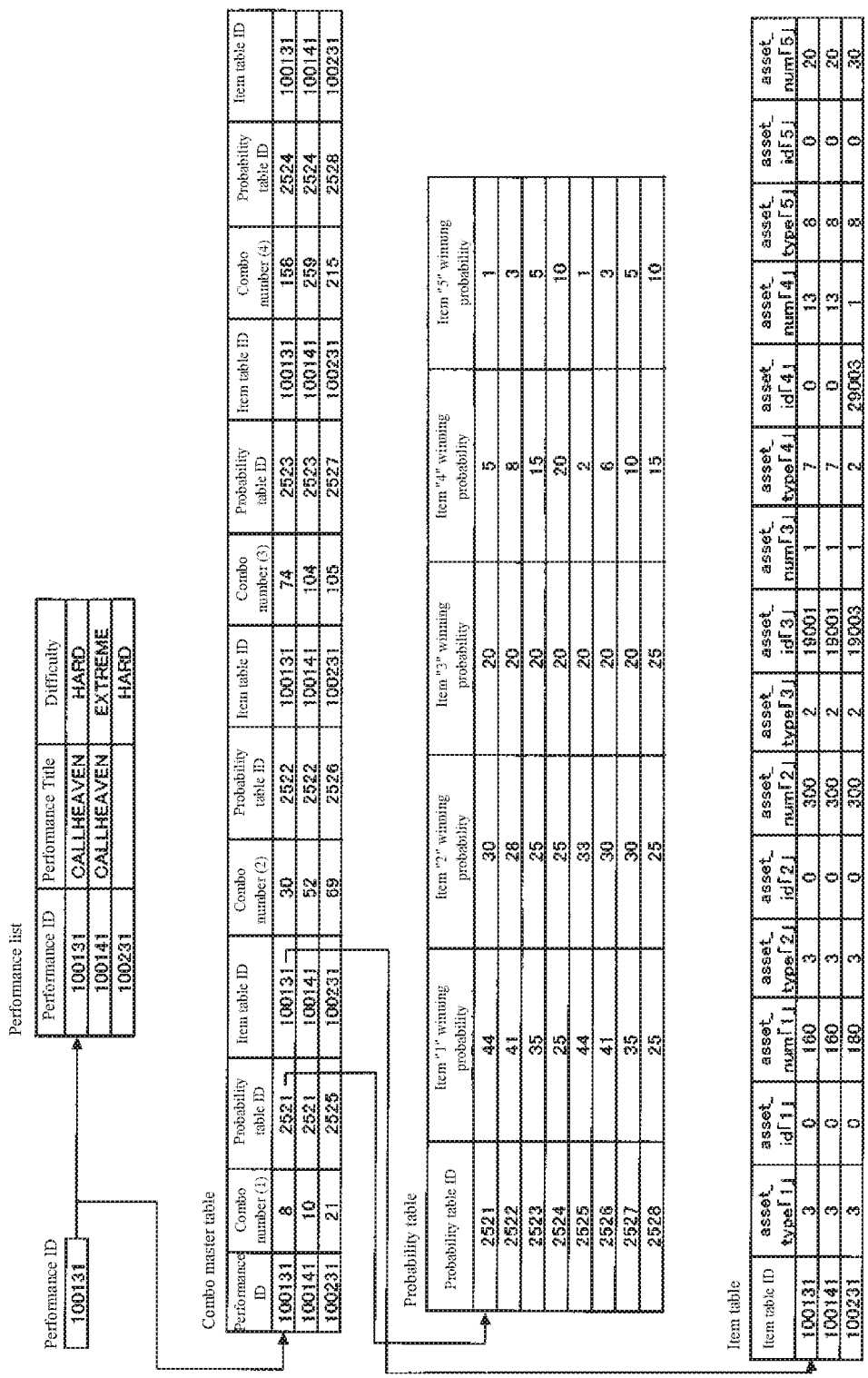
FIG. 7 is a diagram showing specific examples of a combo master table, a probability table, and an item table according to one or more embodiments of the present invention.

FIG. 7 shows specific examples of a combo master table, a probability table, and an item table. FIG. 7 will be referred to in the description of the operation below. In the combo master table, the combo number is set for each performance, and the combo number is set so as to increase in the order of combo number (1)→combo number (2)→combo number (3)→combo number (4).

In the probability table, rarity of an item increases in the order of item "1"→item "2"→item "3"→item "4"→item "5," and the settings are such that the higher is the rarity, the lower is the winning probability. Also, as the combo number in the combo master table increases, a record (probability table record) with a high winning probability is specified for items with a high degree of rarity.

Returning to FIG. 6, the lottery result for each combo number includes "combo number (1) item information," "combo number (2) item information," "combo number (3) item information," and "combo number (4) item information" corresponding to four kinds of achieved number of consecutive times. The "combo number (1) item information," etc., include combo numbers of specific numerical values and "asset_type," "asset_id," and "asset_num" that specifically identify items.

The performance result data is transmitted from the terminal device 1, and "score," "combo number," "acquired items," etc., are associated with "user ID."

Figure 8:
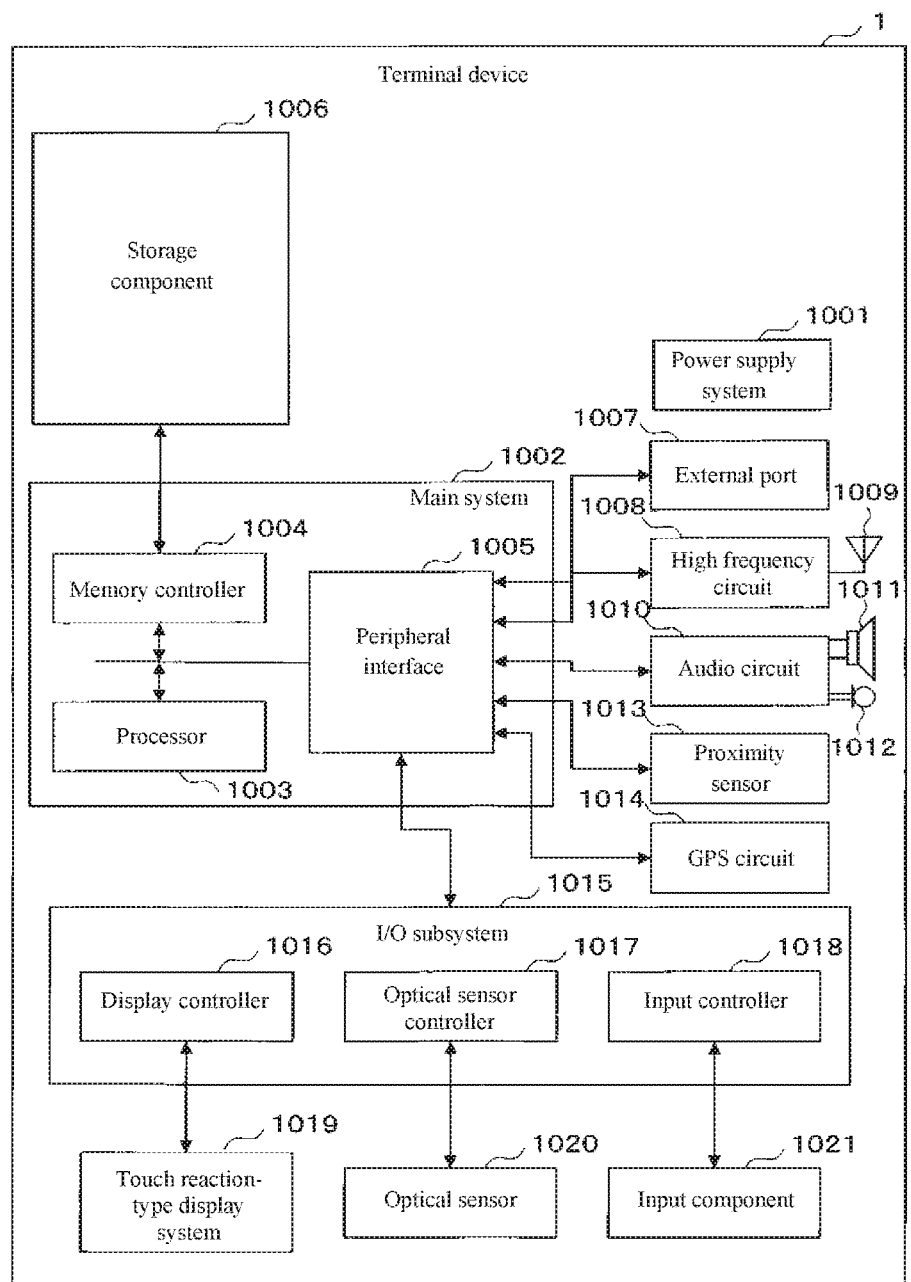
FIG. 8 is a diagram showing a hardware configuration example of a terminal device according to one or more embodiments of the present invention.

FIG. 8 is a diagram showing a hardware configuration example of the terminal device 1.

In FIG. 8, the terminal device 1 comprises a power supply system 1001, a main system 1002 (which includes a processor 1003, a memory controller 1004, and a peripheral interface 1005), and a storage component 1006. The terminal device 1 also comprises an external port 1007, a high frequency circuit 1008, an antenna 1009, an audio circuit 1010, a speaker 1011, a microphone 1012, a proximity sensor 1013, and a GPS (global positioning system) circuit 1014. The terminal device 1 also comprises an I/O (input/output) subsystem 1015 (which includes a display controller 1016, an optical sensor controller 1017, and an input controller 1018), a touch reaction-type display system 1019, an optical sensor 1020, and an input component 1021. The touchscreen of the terminal device 1 includes the touch reaction-type display system 1019, the optical sensor 1020, and the input component 1021.

Figure 9:
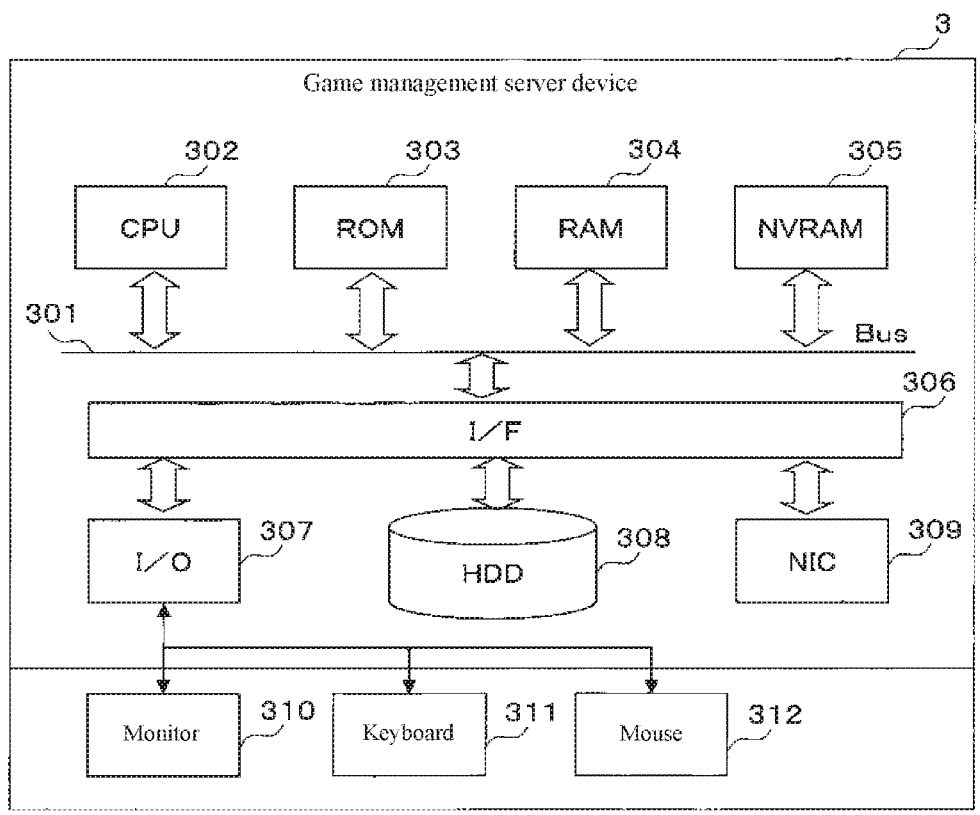
FIG. 9 is a diagram showing a hardware configuration example of a game management server device according to one or more embodiments of the present invention.

FIG. 9 is a diagram showing a hardware configuration example of the game management server device 3.

In FIG. 9, the game management server device 3 comprises a CPU (central processing unit) 302, a ROM (read only memory) 303, a RAM (random access memory) 304, and a NVRAM (non-volatile random access memory) 305, connected to a system bus 301. The game management server device 3 also comprises an I/F (interface) 306, an (input/output device) 307, which is connected to the I/F 306, a HDD (hard disk drive) 308, a NIC (network interface card) 309, and a monitor 310, a keyboard 311, a mouse 312, etc., that are connected to the I/O 307. A CD/DVD (compact disk/digital versatile disk) drive or the like can also be connected to the I/O 307.

Operation

Figure 10:
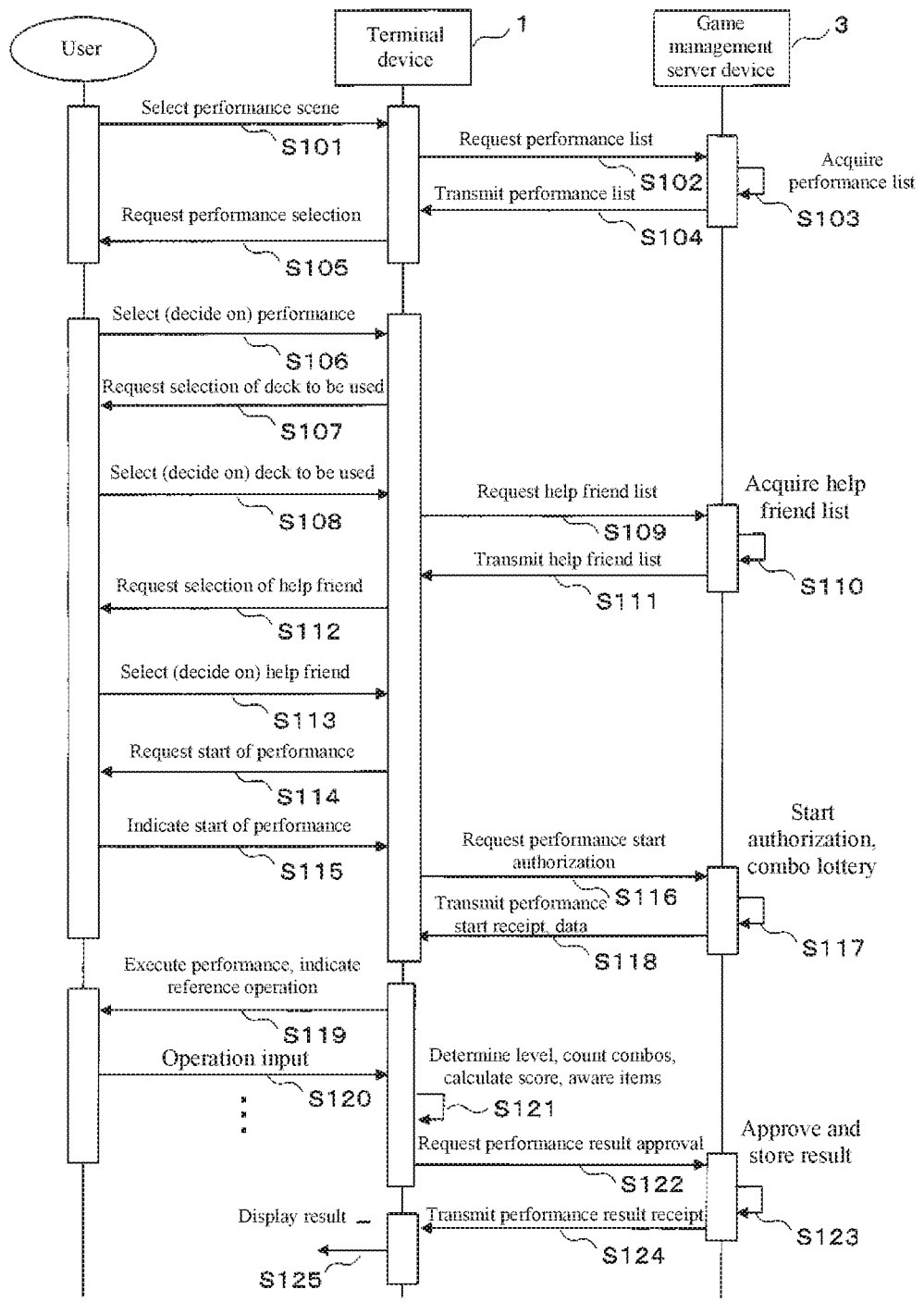
FIG. 10 is a sequence diagram showing an overall processing example of an embodiment according to one or more embodiments of the present invention.

FIG. 10 is a sequence diagram showing an overall processing example according to one or more embodiments of the present invention.

In FIG. 10, when the user selects a performance scene (step S101), the performance scene selection acceptance/performance selection acceptance component 101 of the terminal device 1 accepts the selection, and sends a performance list request to the game management server device 3 along with the performance scene selected by the user (step S102).

In response to the performance list request from the terminal device 1, the performance list provision component 31 of the game management server device 3 searches the performance master using the performance scene as a key, to acquire a performance list (step S103). The performance list provision component 31 then transmits the performance list to the terminal device 1 (step S104).

Upon receiving the performance list from the game management server device 3, the performance scene selection acceptance/performance selection acceptance component 101 of the terminal device 1 presents the performance list to the user and requests selection of the performance (step S105).

In response to this, when the user selects (decides on) the performance (step S106), the performance scene selection acceptance/performance selection acceptance component 101 stores the data for the performance internally.

Next, the used deck/help friend selection acceptance component 102 requests the user to select the deck to be used (step S107).

In response to this, when the user selects (decides on) the deck to be used (step S108), the used deck/help friend selection acceptance component 102 internally stores the data of the deck to be used.

Next, the used deck help friend selection acceptance component 102 makes a request for a help friend list to the game management server device 3 (step S109).

The help friend list provision component 32 of the game management server device 3 performs extraction from the friend data on the basis of attributes in response to the help friend list request from the terminal device 1, and acquires a help friend list (step S110). The help friend list provision component 32 then transmits the help friend list to the terminal device 1 (step S111).

Upon receiving the help friend list from the game management server device 3, the used deck/help friend selection acceptance component 102 of the terminal device 1 presents the help friend list to the user and requests selection of a help friend (step S112).

In response to this, when the user selects (decides on) a help friend (step S113), the used deck/help friend selection acceptance component 102 stores the help friend data internally.

Next, the performance execution component 103 of the terminal device 1 requests the user to indicate the start of the performance (step S114).

In response to this, when the user indicates the start of the performance (step S115), the performance execution component 103 issues a performance start authorization request to the game management server device 3 accompanied by the performance ID (step S116).

The performance start authorization component 33 of the game management server device 3 authorizes the performance start authorization request from the terminal device 1 and also performs a combo lottery with the combo lottery component 34 to acquire a lottery result for each combo number (step S117), and transmits the terminal device 1 data such as the lottery result for each combo number and the performance start receipt (step S118). The processing for the combo lottery will be described in detail below.

Upon receiving the data such as the lottery result for each combo number and the performance start receipt from the game management server device 3, the performance execution component 103 of the terminal device 1 internally stores this data (lottery result for each combo number, etc.) and executes the performance and indicates to the user the reference operation along with the reference operation indication component 104 (step S119).

In response to this, when the user performs an operation input (step S120), the input operation acceptance component 105 accepts the operation input, the level is determined by the level determination component 106, the combo count is performed by the combo counter 107, the score is calculated by the score calculator 108, and an item is awarded by the item awarding component 109 (step S121). This processing is repeated until the performance ends. Processing from level determination up to the item awarding will be discussed in detail below.

When the performance ends, the result display component 110 makes a request for approval of the performance result to the game management server device 3 (step S122).

The performance result approval/storage component 35 of the game management server device 3 approves the performance result approval request from the terminal device 1, stores the performance result (step S123), and transmits the performance result receipt to the terminal device 1 (step S124).

When the result display component 110 of the terminal device 1 receives the performance result receipt from the game management server device 3, it displays the result (step S125).

Figure 11:
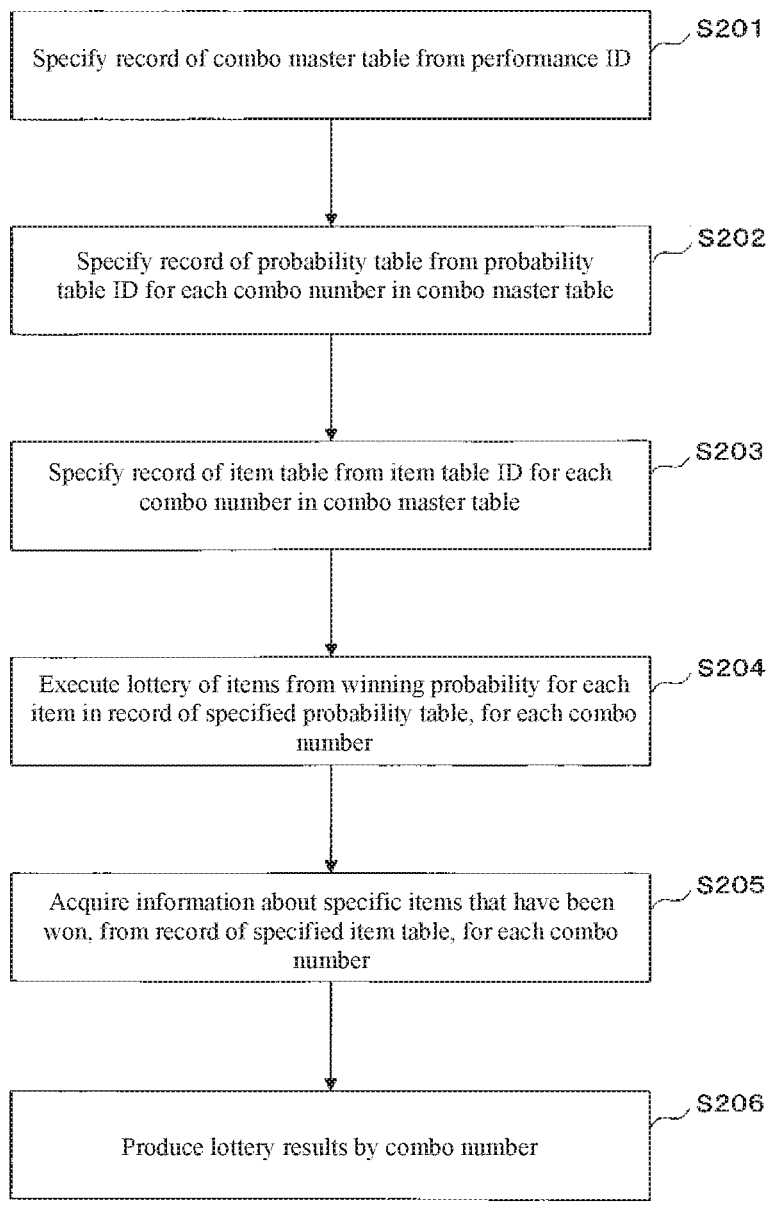
FIG. 11 is a flowchart showing a processing example of a combo lottery according to one or more embodiments of the present invention.

FIG. 11 is a flowchart showing a processing example of a combo lottery (step S117 in FIG. 10).

In FIG. 11, the combo lottery component 34 of the game management server device 3 specifies a record of the combo master table from the performance ID (step S201). For example, in FIG. 7, when the performance ID is "100131," a record of "100131" that is the same as the "performance ID" in the combo master table (one row of data) is specified.

Next, returning to FIG. 11, the combo lottery component 34 specifies a record of the probability table from the probability table ID for each combo number in the combo master table (step S202). In FIG. 7, the "combo number (1)" of the performance ID "100131" in the combo master table is "8," and a record of "2521" that is the same as the "probability table ID" of the probability table is specified from the probability table II) "2521." This would be similar for "combo number (2)" through "combo number (4)."

Next, returning to FIG. 11, the combo lottery component 34 specifies a record of the item table from the item table ID for each combo number in the combo master table (step S203). In FIG. 7, a record of "100131" that is the same "item table ID" of the item table is specified from the item table II) "100131" of the "combo number (1)" of the performance II) "100131" in the combo master table. This would be similar for "combo number (2)" through "combo number (4)."

Next, returning to FIG. 11, the combo lottery component 34 executes a lottery of items from the winning probability for each item in the record of the specified probability table for each combo number (step S204). In FIG. 7, for "combo number (1)" in the combo master table, based on the record of the probability table ID "2521" in the probability able, the lottery is performed at "44%" for item "1," "30%" for item "2," "20%" for item "3," "5%" for item "4," and "1%" for item "5."

Next, returning to FIG. 11, the combo lottery component 34 acquires information about specific items that have been won from the record of the specified item table for each combo number (step S205). In FIG. 7, when item "3" has been won for the "combo number (1)" in the combo master table, for example, specific item information is acquired from "asset_type '3,'" "asset_id '3,'" and "asset_num '3'" in the record of the item table ID "100131" in the item table.

Next, returning to FIG. 11, the combo lottery component 34 produces a lottery result for each combo number based on the acquired information, and transfers it to the performance start authorization component 33 (step S206).

Figure 12:
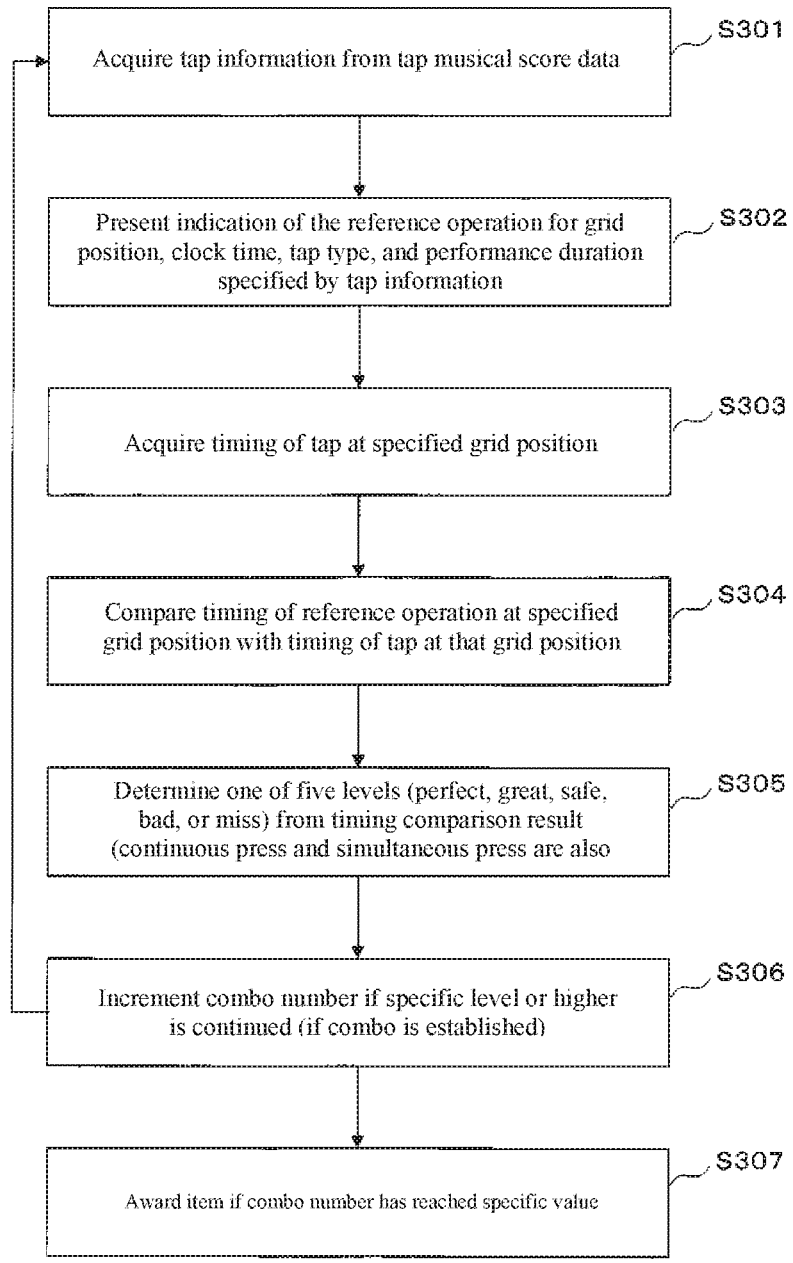
FIG. 12 is a flowchart showing a processing example from the indication of a reference operation to the granting of a reward according to one or more embodiments of the present invention.

FIG. 12 is a flowchart showing a processing example from the indication of a reference operation to the granting of a reward (steps S119 to S121 in FIG. 10).

In FIG. 12, the reference operation indication component 104 of the terminal device 1 acquires tap information from tap musical score data (step S301).

Next, the reference operation indication component 104 presents an indication of the reference operation based on the grid position, clock time, tap type, and performance duration specified by the acquired tap information (step S302).

Next, the level determination component 106 acquires the timing at N hick the specified grid position was tapped from the input operation of the user accepted by the input operation acceptance component 105 (step S303).

Next, the level determination component 106 compares the timing of the reference operation at the specified grid position with the timing of the tap at the grid position (step S304), and determines from the timing comparison result (continuous press and simultaneous press are also considered) which of five levels is applicable (perfect, great, safe, bad, or miss) (step S305). The number of levels is not limited to five.

Next, the combo counter 107 increments the combo number when a predetermined level or higher (such as a level of "safe" or higher) is continued (when a combo is established) (step S306). If the deck to be used selected by the used deck/help friend selection acceptance component 102 includes a specific card (a death-dealing item or the like), the combo counter 107 performs a lottery at a predetermined winning probability (such as 80%) when the continuation of a predetermined threshold level is interrupted, and, if there is a win, continues counting at or above a predetermined level as if the continuation had not been interrupted. The processing then repeats from the acquisition of tap information (step S201).

Also, when the combo number reaches a specific value (the combo numbers (1) to (4) in the combo master table), the item awarding component 109 awards the user with the item according to the lottery result acquired in advance by combo number (Step S307).

SUMMARY

As described above, according to one or more embodiments of the present invention, even a user unfamiliar with an input operation can enjoy combo numbers.

That is, even a user who can achieve only the minimum combo number for which an item lottery is performed will derive the pleasure of acquiring some kind of item, and can find a sense of purpose in trying to achieve a combo number. Also, since there is a chance to acquire all of the items, including items with high degree of rarity, albeit at a low probability, players will derive great pleasure. Furthermore, the chances to acquire items with a high degree of rarity are increased by increasing the combo number, so it is also possible to find a sense of purpose in continuing the game and improving one's skills.

Also, a user unfamiliar with the input operation can be assisted by saving him from having a combo interrupted by a death-dealing item or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 Terminal Device
100 Game Application

101 Performance Scene Selection Acceptance/Performance Selection Acceptance Component
102 Used Deck/Help Friend Selection Acceptance Component
103 Performance Execution Component
104 Reference Operation Indication Component
105 Input Operation Acceptance Component
106 Level Determination Component
107 Combo Counter
108 Score Calculator
109 Item Awarding Component
110 Result Display Component
120 Storage Area
2 Network
3 Game Management Server Device
31 Performance List Provision Component
32 Help Friend List Provision Component
33 Performance Start Authorization Component
34 Combo Lottery Component
35 Performance Result Approval Storage Component

What is claimed is:

1. A game processing method that causes a computer to execute a game program, the method comprising:
  displaying, with a touchscreen of the computer, a reference operation to a user;
  receiving, with the touchscreen, an input operation from a user;
  determining, with a processor of the computer, a matching degree between the input operation and the reference operation;
  outputting, from the processor to a memory of the computer, a level of the matching degree between the input operation and the reference operation based on the determination;
  counting, with the processor, a number of consecutive times that the level continuously exceeds a predetermined threshold level; and
  outputting, from the processor to the memory, information to award a bonus at a predetermined winning probability for an achieved number of consecutive times when the number of consecutive times reaches the achieved number,
  storing, with the memory, table data in which the achieved number of consecutive times is set for each performance and the predetermined winning probability for a predetermined number of bonuses is set for each achieved number,
  wherein the outputting outputs the information to award the bonus that is determined according to a lottery result for every achieved number of consecutive times based on the table data.

2. The game processing method according to claim 1, wherein the reference operation is a finger operation on the touchscreen displayed to the user, and
  wherein the input operation is a finger operation input with a finger of the user on the touchscreen.

3. The game processing method according to claim 1, wherein when there is an item having a specific effect in a deck registered by the user at start of game and continuation of a predetermined threshold level is interrupted, the counting counts the number of consecutive times as if the continuation had not been interrupted.

4. The game processing method according to claim 3, wherein when the continuation of a predetermined threshold level is interrupted, a lottery is performed at a predetermined winning probability, and if there is a win, the counting counts the number of consecutive times as if the continuation had not been interrupted.

5. The game processing method according to claim 2, further comprising:
  storing, with the memory, table data in which the achieved number is set for each performance and the predetermined winning probability for a predetermined number of bonuses is set for each achieved number of consecutive times,
  wherein the outputting outputs the information to award the bonus that is determined according to a lottery result for every achieved number of consecutive times based on the table data.

6. The game processing method according to claim 2, wherein when there is an item having a specific effect in a deck registered by the user at start of game and continuation of a predetermined threshold level is interrupted, the counting counts the number of consecutive times as if the continuation had not been interrupted.

7. An information processing device comprising:
  a touchscreen that;
    displays a reference operation to a user; and
    receives an input operation from the user;
  a memory; and
  a processor connected to the touchscreen and the memory and that:
    determines a matching degree between the input operation and the reference operation;
    outputs, to the memory, a level of the matching degree between the input operation and the reference operation based on the determination;
    counts a number of consecutive times that the level continuously exceeds a predetermined threshold level; and
    outputs, to the memory, information to award a bonus at a predetermined winning probability for an achieved number of consecutive times when the number of consecutive times reaches the achieved number of consecutive times,
  wherein the memory stores table data in which the achieved number is set for each performance and the predetermined winning probability for a predetermined number of bonuses is set for each achieved number of consecutive times,
  wherein the processor outputs, to the memory, the information to award the bonus that is determined according to a lottery result for every achieved number of consecutive times based on the table data.

8. The information processing device according to claim 7,
  wherein the reference operation is a finger operation on the touchscreen displayed to the user, and
  wherein the input operation is a finger operation input with a finger of the user on the touchscreen.

9. The information processing device according to claim 7,
  wherein when there is an item having a specific effect in a deck registered by the user at start of game and continuation of a predetermined threshold level is interrupted, the processor counts the number of consecutive times as if the continuation had not been interrupted.

10. The information processing device according to claim 9,
  wherein when the continuation of a predetermined threshold level is interrupted, a lottery is performed at a predetermined winning probability, and if there is a win, the processor counts the number of consecutive times as if the continuation had not been interrupted.

11. The information processing device according to claim 8, wherein the memory stores table data in which the achieved number is set for each performance and the predetermined winning probability for a predetermined number of bonuses is set for each achieved number of consecutive times, wherein the processor outputs, to the memory, the information to award the bonus that is determined according to a lottery result for every achieved number of consecutive times based on the table data.

12. The information processing device according to claim 8, wherein when there is an item having a specific effect in a deck registered by the user at start of game and continuation of a predetermined threshold level is interrupted, the processor counts the number of consecutive times as if the continuation had not been interrupted.

* * * * *